(12) United States Patent
Herr (10) Patent No.: US 11,965,727 B2
(45) Date of Patent: Apr. 23, 2024

(54) BREACHING POLE AND RELATED METHOD OF USE

(71) Applicant: J&N Tactical LLC, South Haven, MN (US)

(72) Inventor: Jeffrey Herr, South Haven, MN (US)

(73) Assignee: J&N Tactical LLC, South Haven, MN (US)

( * ) Notice: Subject to any disclaimer, the term of this patent is extended or adjusted under 35 U.S.C. 154(b) by 66 days.

(21) Appl. No.: 17/899,347

(22) Filed: Aug. 30, 2022

(65) Prior Publication Data

US 2024/0068791 A1 Feb. 29, 2024

(51) Int. Cl.
| | |
|---|---|
| *F42D 1/22* | (2006.01) |
| *B25J 11/00* | (2006.01) |
| *F41H 13/00* | (2006.01) |
| *F42D 1/14* | (2006.01) |
| *F42D 3/00* | (2006.01) |

(52) U.S. Cl.
CPC ............. *F42D 1/22* (2013.01); *B25J 11/0025* (2013.01); *F42D 1/14* (2013.01); *F42D 3/00* (2013.01); *F41H 13/00* (2013.01)

(58) Field of Classification Search
CPC ..... F42D 1/14; F42D 1/22; F42D 3/00; F41H 13/00; B25J 1/02; B25J 11/00; B25J 11/002; B25J 11/0025
USPC ............... 102/305, 313, 321; 89/1.11; 86/50
See application file for complete search history.

(56) References Cited

U.S. PATENT DOCUMENTS

| | | | | |
|---|---|---|---|---|
| 7,802,509 | B2 * | 9/2010 | Wall | .......................... F42D 1/14 |
| | | | | 89/1.14 |
| 2011/0072956 | A1 | 3/2011 | Wall | |
| 2017/0153092 | A1 * | 6/2017 | Greenwood | ............ F41H 13/00 |

OTHER PUBLICATIONS

UNHITEC website, downloaded May 17, 2022.

* cited by examiner

*Primary Examiner* — James S Bergin
(74) *Attorney, Agent, or Firm* — Warner Norcross + Judd LLP (57) ABSTRACT

A breaching pole is provided including an elongated handle, an elongated arm joined with the elongated handle and a charge placement arm joined with the elongated arm. The charge placement arm can include a shaft having multiple barbs sized and spaced relative to one another so as to frictionally engage an insert placed over the charge placement arm to secure that insert to the arm. The breaching pole is operable to place the insert adjacent a structure using the charge placement arm and subsequently detonate a breaching device associated with the insert to breach the structure. The insert can define a bore with a sidewall. The charge placement arm registers within the bore. The insert can be constructed from compliant material so the insert deformably engages the barbs as the shaft is inserted into the bore of the insert. A related method of use is provided.

17 Claims, 10 Drawing Sheets

BREACHING POLE AND RELATED METHOD OF USE

BACKGROUND OF THE INVENTION

The present invention relates to breaching tools, and more particularly to energetic breaching poles used by police, emergency personnel or military personnel to breach a structure.

Law enforcement, military personnel and Explosive Ordinance Disposal personnel many times are faced with situations where a suspect and/or hostages are located within a building or other structure. The personnel are faced with the task of breaching the building to address the suspect and/or rescue the hostages. Entering the building can be dangerous, particularly if the suspect is armed. Breachers therefore try to perform the entry as efficiently and quickly as possible. In so doing, a breacher typically will open or breach a door in an entryway to gain access to the building. There also are times when fire service personnel vent structures to control movement of a fire and energetics provide a rapid means to do so when seconds matter. Targets such as light walls, windows and roofs are often defeated/disrupted during these energetic breaching operations.

There are a number of breaching tools available to assist personnel breaching a structure and in particular an entryway. One tool is a steel, handheld battering ram that can be used to forcefully ram and defeat a door handle or locking mechanism, and/or a doorjamb to which the handle or lock secures. While this can be efficient, it takes significant force to defeat the handle or lock so that the door opens. Further, as soon as the door swings open, the breacher holding the ram can be exposed, and subject to a line of fire from suspects and/or occupants of the building. The same can be true for fire service personnel using manual tools as it relates to the fire itself. The immediate introduction of oxygen to a fire from an open door, window or hole in the wall/roof can present a safety hazard which can be mitigated by being offset from the target area.

Another tool is a breaching pole utilizing energetic material, such as detonating cord, moldable explosives or linear shaped charges, disposed on a distal end of the pole, far from a handle which the breacher grasps. The breacher uses the pole to place the explosive charge adjacent to the handle, lock or hinges of the door. After proper placement, the user initiates the charge and explosively defeats the handle, lock or hinges, thereby causing the door to open or become separated from the hinges, all while the breacher is distal from the doorway.

While effective, there are several issues with conventional breaching poles that utilize explosive charges. For example, most breaching poles are linear such that a breacher holding the pole must thrust the pole and an explosive charge associated with the distal end of the pole against the structure of the door. In turn, when the door swings or is defeated, the breacher can sometimes be in a line of fire through the doorway from occupants inside the building. Thus, many conventional breaching poles do not adequately allow the breacher to remain concealed after the door is breached. Further, such linear poles sometimes do not allow the breacher to be positioned clear of over pressure or debris blown from the door.

Another issue is that the distal end of the pole must be outfitted with a holder that directs the energetic materials toward an intended target of the door, such as a door handle and locking mechanism. Many times, the intended targets differ in shape, position and size, so the holder might not be able to adequately direct the charge and explosion toward the intended target.

In addition, most holders are rather simple, so frequently a breacher will use tape to place the charge in a particular location along the holder. In some cases, the tape holding the charge can move relative to the holder, thereby causing a potential misdirection of the explosion. Again, due to the simplicity of most holders, precise placement of the explosive charges relative to the structure of the door cannot be easily customized to maximize the breaching capability of the pole. As a result, when the energetic materials are initiated, it might not adequately defeat the door handle, lock and/or hinge, in which case, the breacher and other personnel cannot quickly and safely enter the building through the entryway. The occupants of the building also will be alerted to the fact that someone is trying to enter the building and prepare accordingly, which can present an even more dangerous situation for the personnel.

Accordingly, there remains room for improvement in the field of breaching tools and in particular the structure function and capabilities of explosive breaching poles.

SUMMARY OF THE INVENTION

A breaching pole is provided including an elongated handle, an elongated arm joined with the elongated handle and a charge placement arm joined with the elongated arm. The charge placement arm can include a shaft having multiple barbs sized and spaced relative to one another so as to frictionally engage an insert placed over the charge placement arm to secure that insert to the arm. The breaching pole is operable to place the insert adjacent a structure using the charge placement arm and subsequently detonate a breaching device associated with the insert to breach the structure.

In one embodiment, the breaching pole can include an articulating knuckle joining the elongated arm and the charge placement arm joined. The articulating knuckle can enable the charge placement arm to articulate through an angle of at least 45 degrees offset relative to a longitudinal axis of the elongated arm.

In another embodiment, the barbs can be covered by the insert when the shaft is disposed in a bore of the insert. The insert can be constructed from a compliant material that conforms to the shape of the barbs. In so doing, the compliant material can stretch and firmly grasp the barbs when the insert is impaled on or covering the charge placement arm.

In still another embodiment, the breaching pole can include an elongated shroud joined with and extending from the elongated arm. A guide tube can be disposed within the elongated shroud. The guide tube and elongated shroud can house and generally surround a shock tube extending within the guide tube from a position adjacent the grasping handle to the articulating knuckle.

In yet another embodiment, each of the barbs can include a flared shape including a proximal end and a distal end. Each barb can flare outward as the barb extends from the distal end toward the proximal end of the barb. In some cases, each barb can include a frustoconical exterior surface that forms the flared shape. Each barb can include a frustoconical ring shape that circumferentiates the arm axis.

In even another embodiment, the proximal end of each barb can include a shoulder that transitions radially inward toward the shaft. This shoulder can be disposed at an angle between 45 degrees and 90 degrees, inclusive, relative to the arm axis.

In a further embodiment, the insert can be constructed from a compliant material and the bore can include a first diameter. Each barb can include an outer diameter and an inner diameter. The first diameter can be less than the outer diameter and greater than the first diameter. The insert constructed from compliant material can deformably engage barbs as the shaft is inserted into the bore of the insert.

In still a further embodiment, each barb can include a ramped entry surface that is operable so as to slidingly engage the bore with the ramped entry surface so that the charging placement arm can enter the bore at a predetermined depth. The ramped entry surface can forcibly expand the first diameter to a greater second diameter. The engagement of the barbs with the bore can frictionally hold the insert on the charge placement arm.

In yet a further embodiment, a method of using the breaching pole is provided, including providing an elongated handle joined with an elongated arm joined with a charge placement arm, the charge placement arm including a shaft having an arm axis and a plurality of barbs; and placing an insert over the charge placement arm so that the barbs frictionally engage the insert to temporarily secure that insert to the charge placement arm.

In even a further embodiment, the method can include placing the shaft and barbs within the bore of the insert, which can be constructed from a compliant material. The compliant material can deform to conform to the barbs to retain the insert on the charge placement arm.

In a further embodiment, the method can include forming a bore in the insert with a cutting tool; inserting the distal tip into the bore; sliding the insert along the charge placement arm so that the plurality of barbs move along a sidewall of the bore; and attaching the breaching device to the insert distal from the bore, while the insert is impaled on the charge placement arm.

The breaching pole and methods of the current embodiments herein can be highly efficient, safe and customizable. Where the breaching pole includes a barbed charge placement arm, that arm can be quickly and easily outfitted with a highly customizable insert. The insert can be constructed from a compliant material, such as foam, cardboard or some other material, and accordingly can be easily cut with a utility tool or knife to a particular shape, or modified to precisely place a breaching charge or device within a recess of the insert. Where the barbs are flared, those barbs can easily and efficiently frictionally engage the insert as it is applied to the arm. Where the charge placement arm and its shaft are round or generally cylindrical, the shape can deflect an explosive shockwave so that the integrity of the charge placement arm is not compromised. Where the breaching pole includes the articulating knuckle, the charge placement arm and insert can be precisely positioned and angled relative to the door, lock and/or hinge to maximize destruction of the same with an explosive charge. The articulating knuckle also can provide enhanced safety to the breacher, allowing them to safely direct the shockwave from an explosion. Where the breaching pole includes a cover shroud, that shroud and any guide can protect any shock tube extending therethrough.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A breaching pole of a current embodiment is shown in FIGS. 1-9 and generally designated 10. On a high level, the breaching pole 10 can be in the form of an elongated pole that can place a breaching device 80 (FIG. 10) adjacent a structure 100 which optionally can be a door forming a portion of an entryway. The breaching pole can place the breaching device 80 such that it is adjacent a door handle 101, lock mechanism, latches or other securing elements that hold the door in place in the entryway. The breacher B can use the components of the breaching pole 10 to detonate or activate a focused energetic or explosive charge associated with a breaching device 101 to defeat a portion of the structure 100, such as the door handle and/or its lock mechanism 101, door hinge or other component so that the door 100 is forced open or otherwise more easily opened to gain access into the building 102 with which the structure 100 is associated. The pole can be of a sufficient elongated length so that it can extend a substantial distance, thereby allowing the breacher B to stand clear of the structure 100, and optionally along the side of the building 102, so that the breacher is less exposed to the entryway and any potential line of fire coming from occupants within the building 102. Optionally the structure can be a door as shown, or a window, wall, panel or frame of a building as shown, or of a vehicle, aircraft, vessel, or other item. The breaching pole can be used to breach or defeat the structure to gain access, enter, view into, vent or otherwise take action through or relative to the structure.

With reference to FIGS. 1-4, the breaching pole 10 can include an elongated handle 20 that is joined with an elongated arm 30 which is further joined with a charge placement arm 40 upon which an insert 60 can be disposed. The pole 10 can have associated with it a shock tube or thermo tube 70 that extends from an actuator 75 along the pole 10 and its various components as described below to the insert 60 and one or more breaching devices 80. These breaching devices can be in the form of detonating cord, sheet explosives, moldable explosives, flash powders or other explosive/energetic charges that are associated with the insert 60 as described below.

Figure 1:
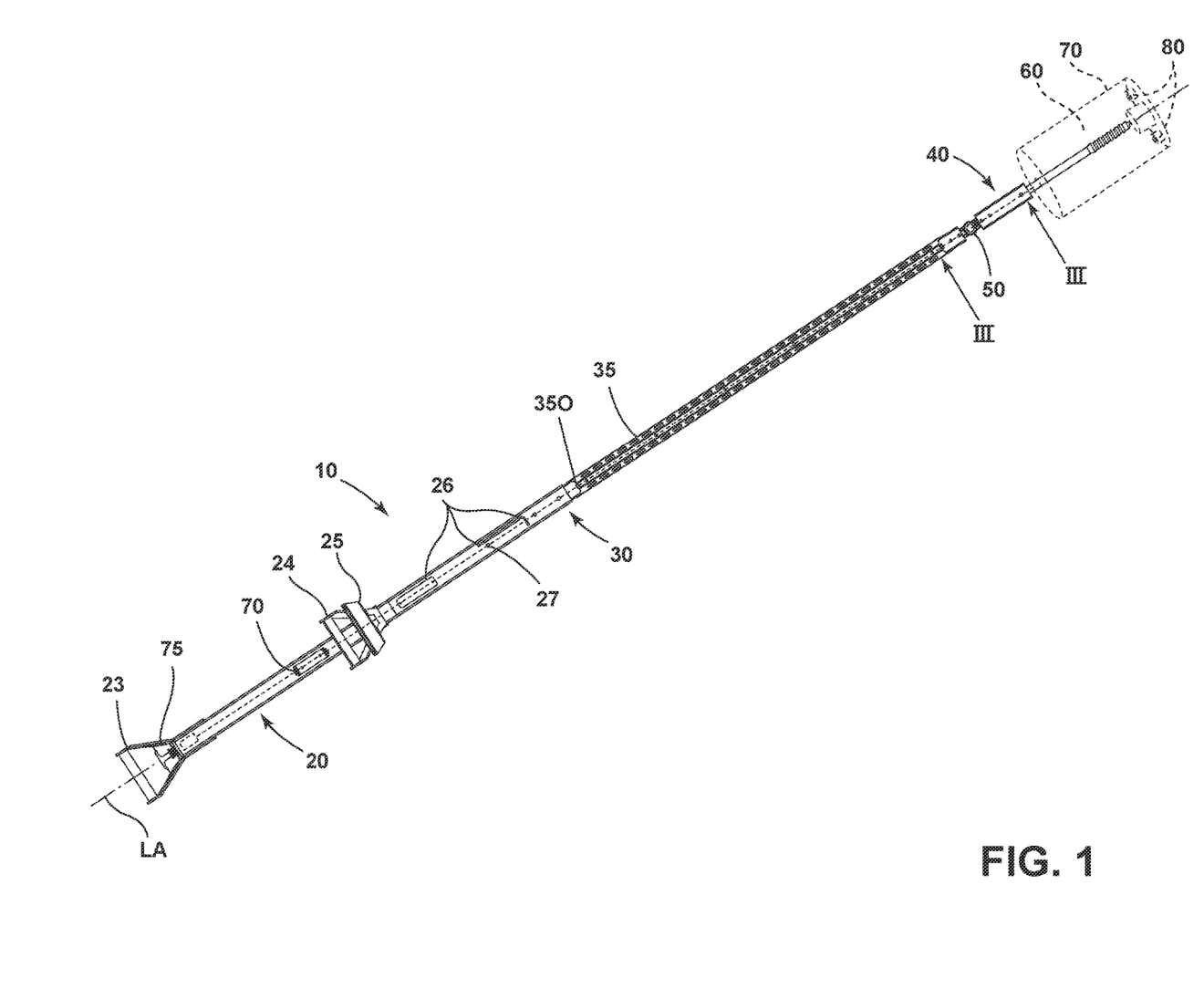
FIG. 1 is a top view of a breaching pole of the current embodiment.
Figure 2:
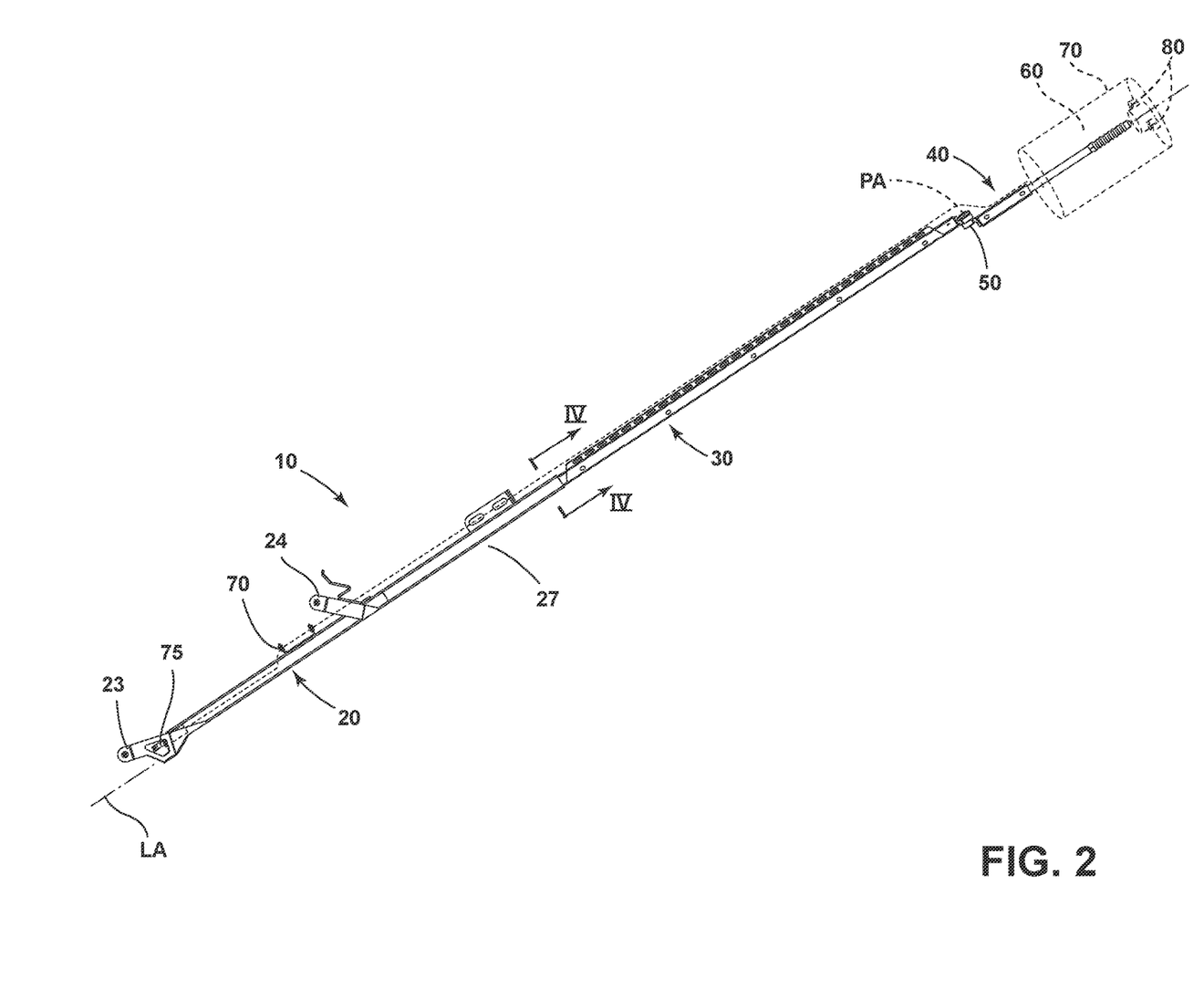
FIG. 2 is a side view of the breaching pole.
Figure 5:
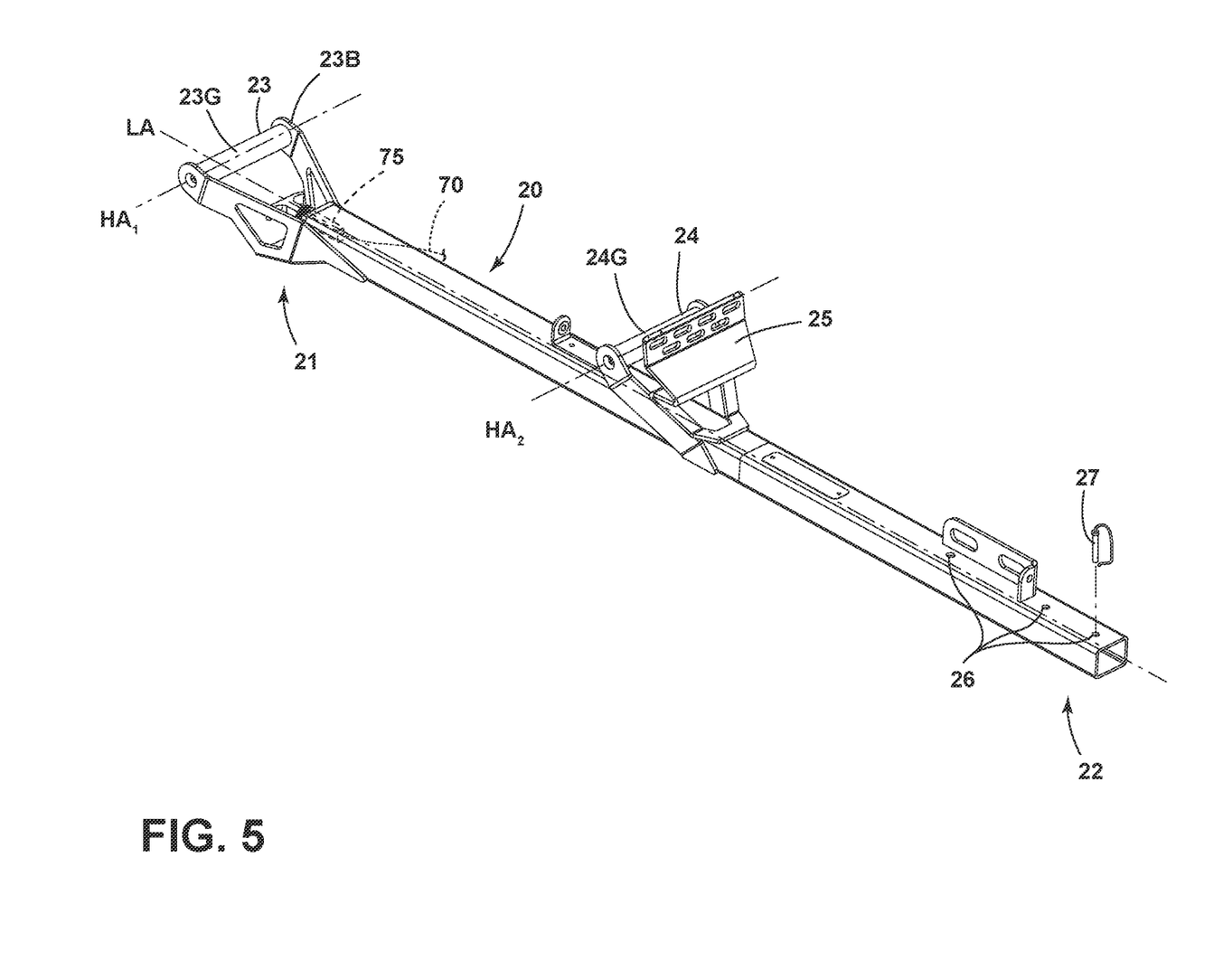
FIG. 5 is a perspective view of an elongated handle of the breaching pole.

The optional handle 20, shown in FIGS. 1, 2 and 5 can be in the form of an elongated tubular handle defining a void or cavity to reduce weight. The elongated handle can extend along a longitudinal axis LA that can be common to the elongated arm 30, the charge placement arm 40, the insert 60 and a portion of the articulating knuckle 50, which optionally can join the charge placement arm 40 and the elongated arm 30 as described below. The elongated handle 20 can extend from a proximal end 21 to a distal end 22. The proximal end 21 can be disposed closer to the breacher B in use. The proximal end 20 can include a grasping handle 23 which can be mounted to the tubular portion of the elongated handle 20 via a bracket 23B. The handle 23 can include a grasping surface 23G that extends along a handle axis HA1. The handle axis HA1 can be transverse, and optionally perpendicular to the longitudinal axis LA. Of course, in other applications and constructions, this handle axis HA1 and the handle grasping surface 23G as well can be parallel to or aligned with the longitudinal axis LA. Optionally, the elongated handle 20 further can include a second grasping handle 24 which also can be transverse longitudinal axis LA such that its grasping surface 24G and handle axis HA2 are transverse to that longitudinal axis. As with the other handle axis HA1, the handle axis HA2 can be perpendicular to, offset relative to, parallel to and/or common with the longitudinal axis LA. Of course, in some applications, the second handle 24 can be absent from the construction altogether. Indeed, the handle 23 also can be absent with the elongated handle 20. The handles 23 and 24 each optionally can be a tubular section, outfitted with a gripping structure such as a rubber grip or some other grippable element or surface. The second handle 24 can be outfitted with a shroud 25 that extends upwardly and is in a plate formed to protect the breacher's hand when the hand is grasping the grasping surface 24G. The handles 23 and 24 can be spaced apart from one another a preselected distance, optionally 1 foot, 2 foot or other distances depending on the amount of leverage and construction of the elongated handle 20.

Figure 4:
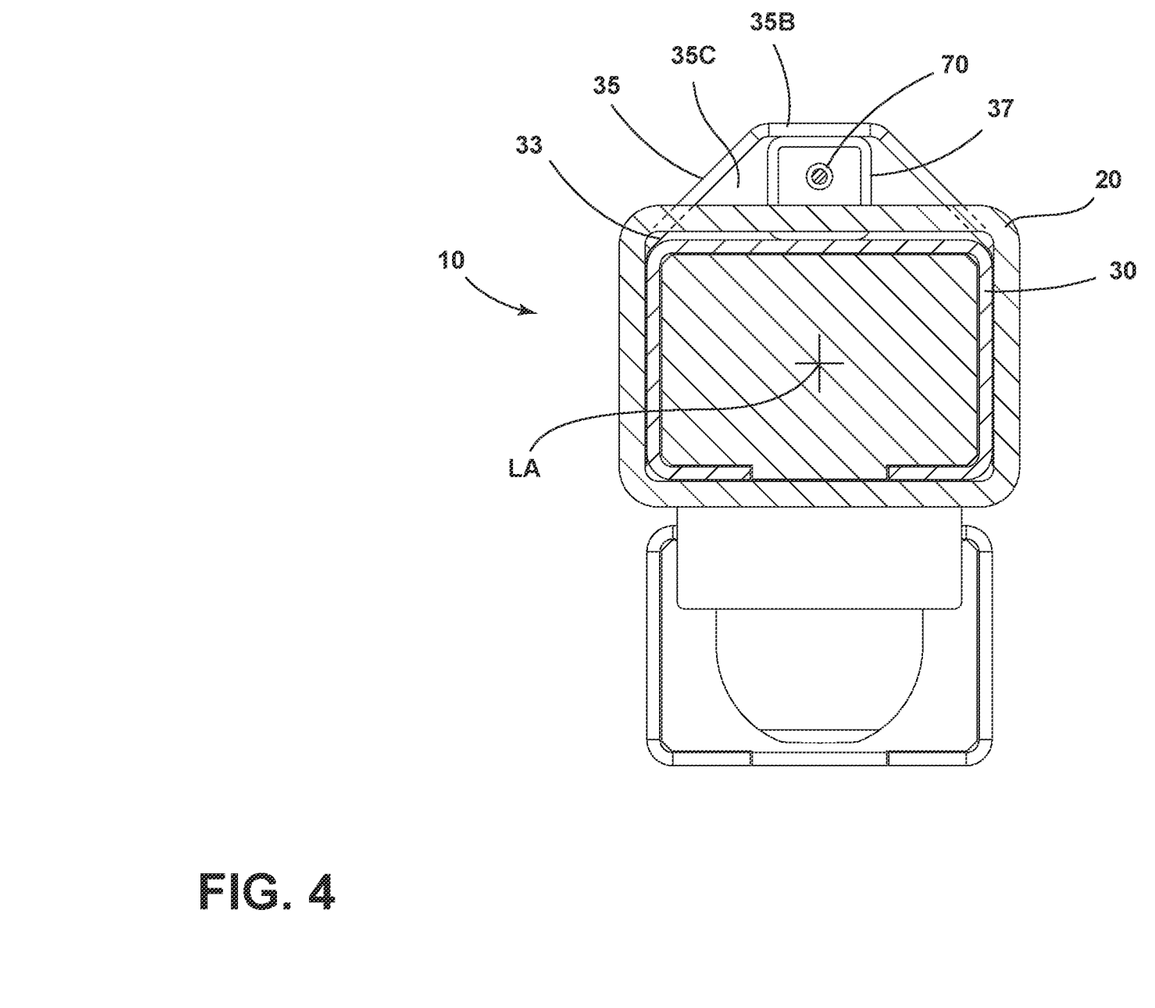
FIG. 4 is a section view of a cover shroud, guide tube and elongated arm of the breaching pole.

As further shown in FIG. 5, the elongated handle 20 can be in the form of a tube as mentioned above. The tube or handle can define one or more pin placement holes 26. These pin placement holes can be configured to receive a pin, fastener or other connecting element 27 which extends through the holes 26 as well as corresponding holes defined in the elongated arm 30. In this manner, the overall length of the breaching pole 10 can be set simply by placing the pin 27 through respective holes. With this pin hole construction as well, the breaching pole 10 easily can be broken down into its components for compact transport and storage. For example, the elongated handle 20 can be separated from the elongated arm 30 so that these two components can be laid side-by-side and more easily stored and transported in a storage pack or box. The components also can be easily joined with and attached to one another simply by installing the arm and handle relative to one another, for example, by inserting a portion of the arm 30 into a void or interior of the elongated handle 20 as shown in FIG. 4. There, a portion of the elongated arm 30 is disposed inside the handle 20. Again, these components can slide and telescope relative to one another to change the overall length of the breaching pole depending on the application. The pin 27 can set that overall length by placement in a particular hole 26. Of course, in other applications, the elongated handle 20 and the elongated arm 30 can be a single integral piece, in some cases also integral with the charge placement arm 40. Further, in some applications all of these components can be a single tube, which is modified to include the features of the charge placement arm 40 as described below to manipulate and move an insert 60 relative to a structure to be breached.

In some applications, the elongated handle 20 can be deleted from the breaching pole 10. Without the handle, the remaining end of the pole 10, such as the elongated arm 30 and charge placement arm 40 can be attached to a vehicle, robot, drone or other machine or equipment to advance the pole toward and place the pole relative to a structure for breaching the same.

Returning to FIGS. 1 and 5, the elongated handle 20 can be outfitted with an actuator 75. The actuator, also referred to as a command initiated firing device or initiator, can come in a variety of forms, whether mechanical or electrical, and as shown can be in the form of a pull pin assembly. The actuator or initiator can allow a breacher or other user to initiate the breaching device 80. The actuator alternatively can be in the form of a pin gun and shock tube combination or it can be partially or wholly electronic, in the form of a switch, electrical wiring, an electronic detonator or even a remote control detonator. In some cases, the actuator 75 can be removable from the breaching pole 10 so that another user, other than the breacher B holding the breaching pole can actuate the breaching devices 80 remotely. This can assist the breacher B while pressing, maintaining intimate contact between the energetic material and the targeted area to be breached. As mentioned above, the actuator 75 can be joined with a shock tube 70, or some other elongated wire or member that extends along or within the elongated handle 20 and the elongated arm, ultimately to the insert 60 and the breaching devices 80 associated with the insert 60.

Figure 6:
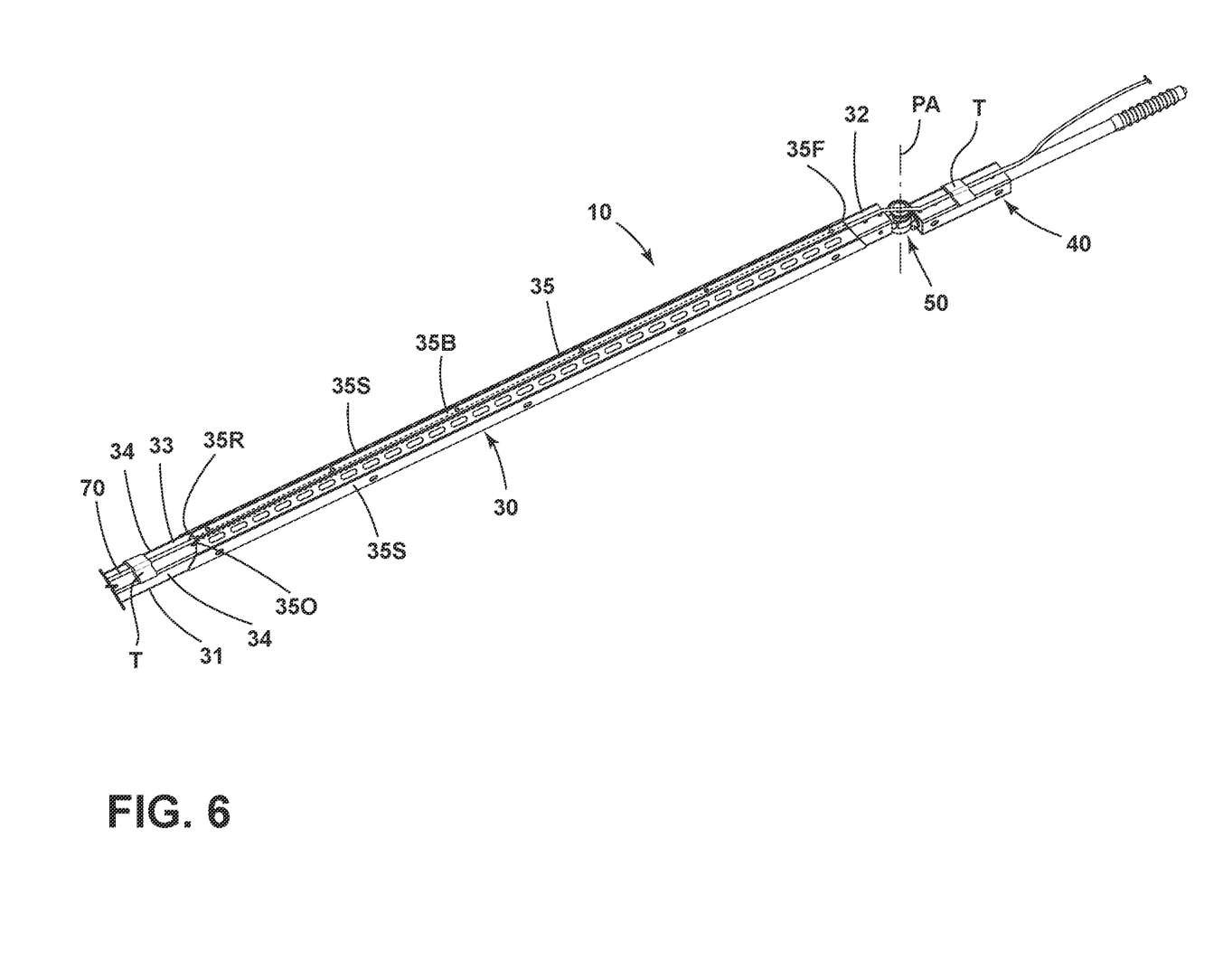
FIG. 6 is perspective view of the elongated arm, knuckle and charge placement arm.
Figure 7:
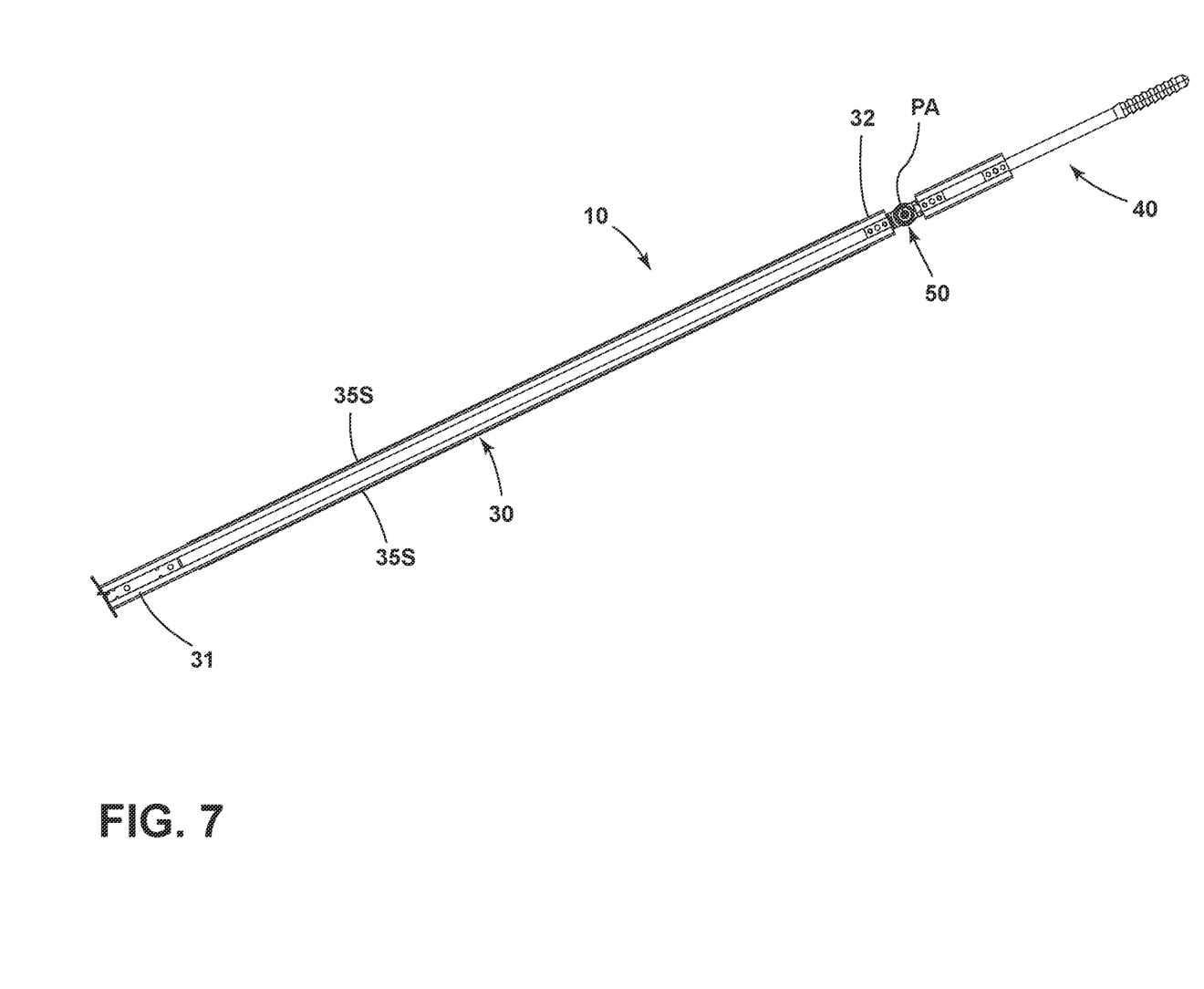
FIG. 7 is a bottom view of the elongated arm, articulating knuckle and charge placement arm.

With reference to FIGS. 1 and 6, as mentioned above, the elongated handle 20 can be joined with an elongated arm 30. The elongated arm 30 as shown optionally can be longer than the handle 20. Of course, in other cases, these elements can be the same length or the lengths reversed. The elongated arm 30 can include a proximal end 31 and a distal end 32. The proximal end 31 can be joined with the distal end 22 of the elongated handle 20 via the pin 27 or some other connection mechanism. And again, these components can be integral and of a single piece construction in some applications. The elongated arm 30 can include an upper surface 33 and opposing side surfaces 34. The elongated arm can extend away from the distal end of the elongated handle and can be joined at its distal end 32 with the articulating knuckle 50 as described below.

Optionally, the elongated arm 30 can include a shroud 35 that can provide a protective cover over a shock tube 70 or other cord extending through it. This shroud 35 can include a rearward opening 35R and a forward opening 35F. The rearward opening 35R can extend upwardly and over the upper surface 33 of the elongated arm 34, which optionally can be in the form of a tube as well. The shroud can include a bridge portion 35B that transitions to respective side portions 35S which can extend downward along the sides 34 of the elongated arm 30. The bridge portion 35B can form a cavity 35C between it and the upper surface 33 of the elongated arm 30 shown in FIG. 4. Within this cavity 35C formed by the shroud, the shock tube 70 can be disposed and protected. Optionally, as shown in FIGS. 1 and 6, the bridge portion 35B can form an opening 35O that is generally C-shaped when viewed from the top view in FIG. 1. This shape can be curved or angled or generally nonlinear as seen in the top view there. This can allow a user to more easily insert the shock tube or electronic firing wire 70 into and under the shroud.

The shroud can extend from the proximal end 31 to the distal end 32 of the elongated arm, and optionally can be of a length greater than 1 foot, greater than 2 feet, greater than 3 feet, greater than 4 feet, between 1 and 3 feet, between 1 and 4 feet, between 1 and 2 feet in length to provide extensive protection of the shock tube 70. Optionally, the elongated arm 30 can further include a guide tube 37 that is disposed within the elongated shroud 35. This guide tube 37 can form an optionally continuous tube or void within which the shock tube 70 can be disposed. The guide tube 37 can be slightly shorter than the elongated shroud 35 so that it does not extend beyond the proximal and distal ends of the shroud. The guide tube 37 can be disposed between the bridge 35B of the shroud and the upper surface 33 of the elongated arm, optionally centered over the longitudinal axis LA of the breaching pole 10. The guide tube as shown can be of a rectangular form, but of course other cross section shapes, such as circular, triangular or other polygonal configurations can be selected depending on the application. In some cases, the guide tube can be formed from opposing side walls that are secured to the shroud and/or to the upper surface of the elongated arm 30. In yet other cases, the tube can be a semicircular or channel shaped elongated element that is secured to the upper surface 33 of the elongated arm 30.

Further optionally, the shroud and/or guide tube can be in the form of multiple independent portions separated from one another by a distance. This can allow various pieces of scrap metal and tubing to be used instead of a continuous piece. The shroud and guide, as well as all the arms of the pole, can be constructed from a metal such as aluminum, carbon fiber and/or polymers for light weight. In other cases, the guide 37 can be constructed from a polymeric material to facilitate easy insertion and sliding of the shock tube 70 relative to the tube. In yet other applications, the shroud and guide tube can be formed as an integral piece, optionally molded or formed in a U shape and secured to the elongated arm.

Figure 3:
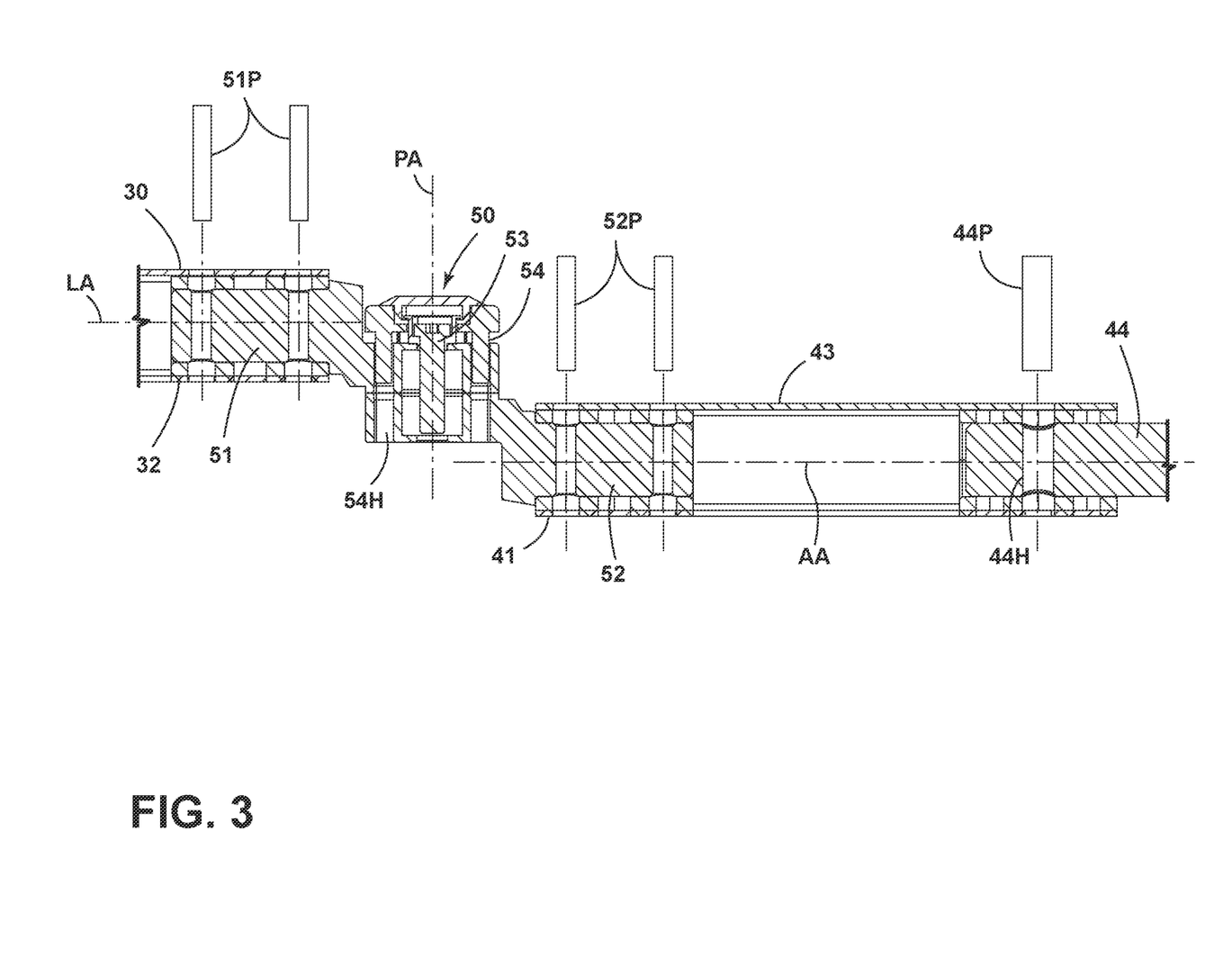
FIG. 3 is a section view of an articulating knuckle of the breaching pole.
Figure 8:
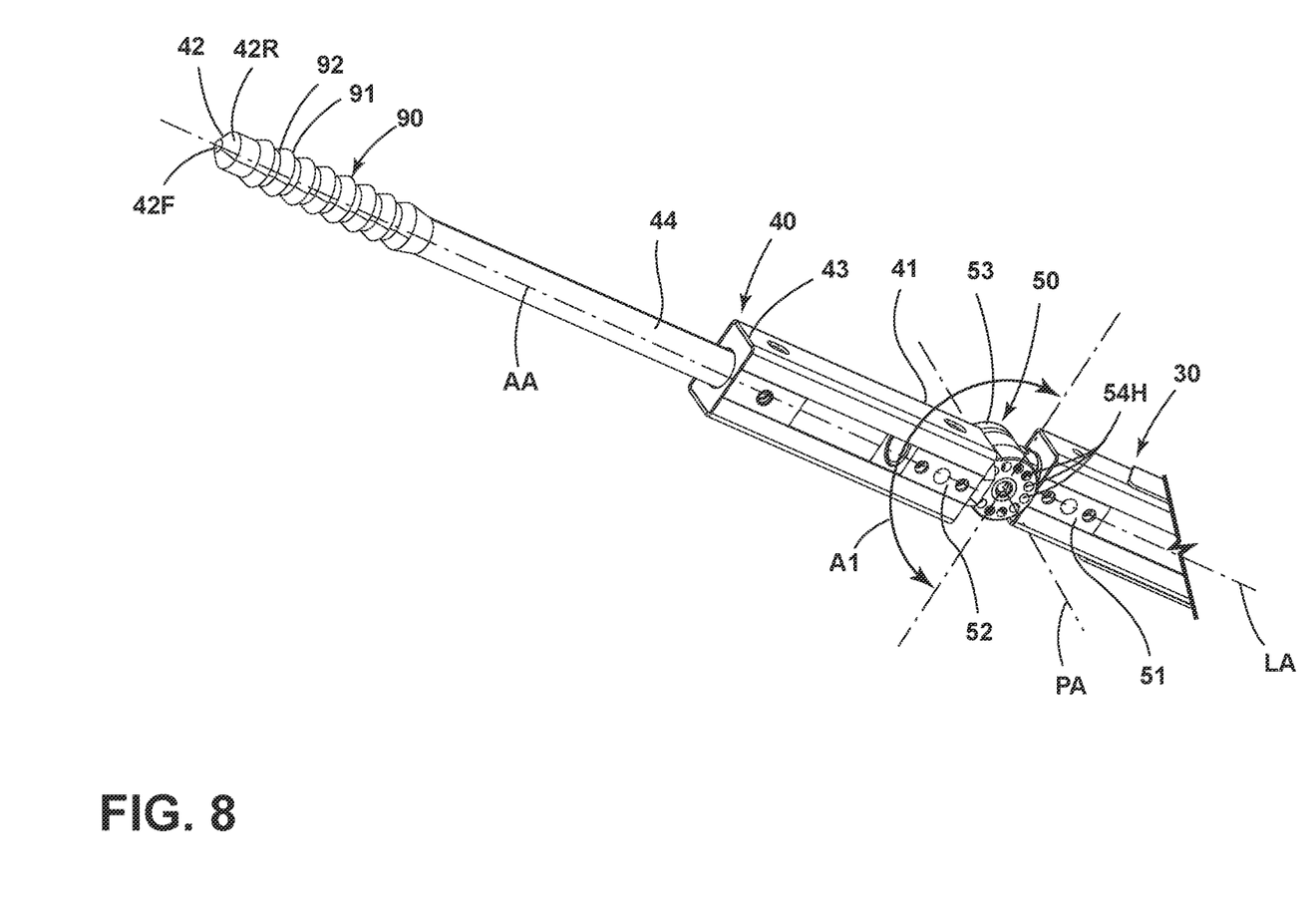
FIG. 8 is a lower perspective view of the charge placement arm and articulating knuckle.

The breaching pole 10 optionally can be outfitted with an articulating knuckle 50. The articulating knuckle can be disposed between and can join the elongated arm 30 and the charge placement arm 40. As shown in FIGS. 3 and 8, the articulating knuckle 50 can include a first connecting block 51 and a second connecting block 52. The first connecting block 51 can be secured with pins 51P that extend through holes in the elongated arm 30 and in particular the distal end 32 thereof as well as the connecting block 51. The second connecting block 52 likewise can be connected to the charge placement arm 40 with pins 52P that extend through holes in the charge placement arm 40 and the second connecting block 52. As shown, the connecting blocks can fit within the internal cavities of the respective elongated arm 30 and a portion of the charge placement arm 40. Of course, these connecting blocks can be replaced with tubular portions that fit over the ends of the respective elongated arm and charge placement arm. The pins 51P and 52P can be replaced with direct weldments between respective portions of the articulating knuckle 50, the elongated arm 30 and the charge placement arm 40.

As shown in FIG. 3, the articulating knuckle 50 can include a control or locking dial 53 that includes one or more pins 54 that can be biased into one or more respective holes 54H to secure the first and second connecting blocks in a predetermined angular orientation relative to one another, and consequently the respective elongated arm 30 and charge placement arm 40 in a similar orientation relative to one another. These orientations can be set by a breacher or other user depending on the structure to be breached and the angle desired by the breacher for placement of the breaching devices and insert relative to the structure.

The articulating knuckle 50 can allow the charge placement arm 40 to pivot about a pivot axis PA relative to the elongated arm 30 to a variety of different angles. As shown in FIG. 8, the charge placement arm 40, and in particular its arm axis AA, can be displaced through an angle A1 relative to the longitudinal axis LA. As one example, the articulating knuckle 50 can allow the arm axis AA to be disposed at any angle A1 relative to the longitudinal axis LA. The control 53 can be actuated by a user to remove the pins 54 from respective pin holes 54H such that the user can rotate the charge placement arm 40 and associated arm axis AA into any selected or predetermined angle A1. This predetermined angle A1 can be offset relative longitudinal axis LA by 10°, 20°, 30°, 40° 50°, 60°, 70°, 80°, 90°, 100°, 110°, 120°, 130°, 140°, 150°, 160°, 170°, 180°, about 45° to about 90°, inclusive, or other angles or sub angles of any of the foregoing depending on the application and the configuration of the articulating knuckle. Optionally, the pin 54 and hole 54H configuration can be replaced with a clamp or clutch mechanism that allows an infinite number of angles to be precisely selected and set such that the arm axis AA is at that angle A1 relative to the longitudinal axis LA.

With further reference to FIG. 3, the second connecting block 52 and generally the articulating knuckle 50 can be joined with the charge placement arm 40. This charge placement arm 40 can include a base frame 43 that is secured to the second connecting block 52, optionally via the pins 52P as described above. This base frame 43 also can be secured to a shaft 44 via one or more shaft pins 44P. Base frame 43 optionally can be the form of a tube, such that the connecting block 52S and an end of the shaft 44 fits within the base frame 43. Of course, in other applications, these elements can be integrally formed with one another to form a single piece. In yet other applications, the components can be fastened, welded or otherwise secured to one another in a different manner, with or without the base frame 43 and/or connecting block 52.

Generally, the charge placement arm 43 can include a proximal end 41 joined with the articulating knuckle 50 and a distal tip 42. As mentioned above, the arm 40 also can include a shaft 44 having an arm axis AA extending between the proximal end 41 and a distal tip 42. As shown in FIGS. 3 and 8, the shaft 44 can define a hole or aperture 44H within which a pin 44P or fastener extends to secure the shaft 44 to the optional base frame 43 and/or in other embodiments directly to the articulating knuckle 50 and its connecting block 52. The shaft 44 can be configured generally as a cylindrical bar, and can include one or more barbs 90 that can be positioned, sized and configured to secure the insert 60 to a portion of the shaft and the charge placement arm 40 in general. The shaft 44 can extend outward from a forward portion 43F of the base frame 43. For about half its length, the shaft 44 can take on a regular shape, which is shown as a generally cylindrical shape. Of course, other shapes, such as ellipsoid, rounded or polygonal shapes can be used in this portion of the shaft 44. The shaft can terminate at the distal tip 42, which as shown can be slightly pointed, and optionally in the form of a frustoconical shape including a ramped surface 42R that extends to a forward surface 42F which optionally can be a flat surface or a pointed tip.

Between that distal tip 42 and rearward of it, and optionally within the first quarter, third, half or other portion of the shaft 44, the shaft 44 can include one or more barbs 90. These barbs as shown can take on a variety of configurations, and can be configured to engage an insert 60 placed on the charge placement arm 40, in particular on the shaft 44 and/or barbs. The barbs 90 as illustrated can include a flared shape, each including a proximal end 91 and a distal end 92. Each barb can flare outward as each barb extends from its distal end toward the proximal end.

Figure 9:
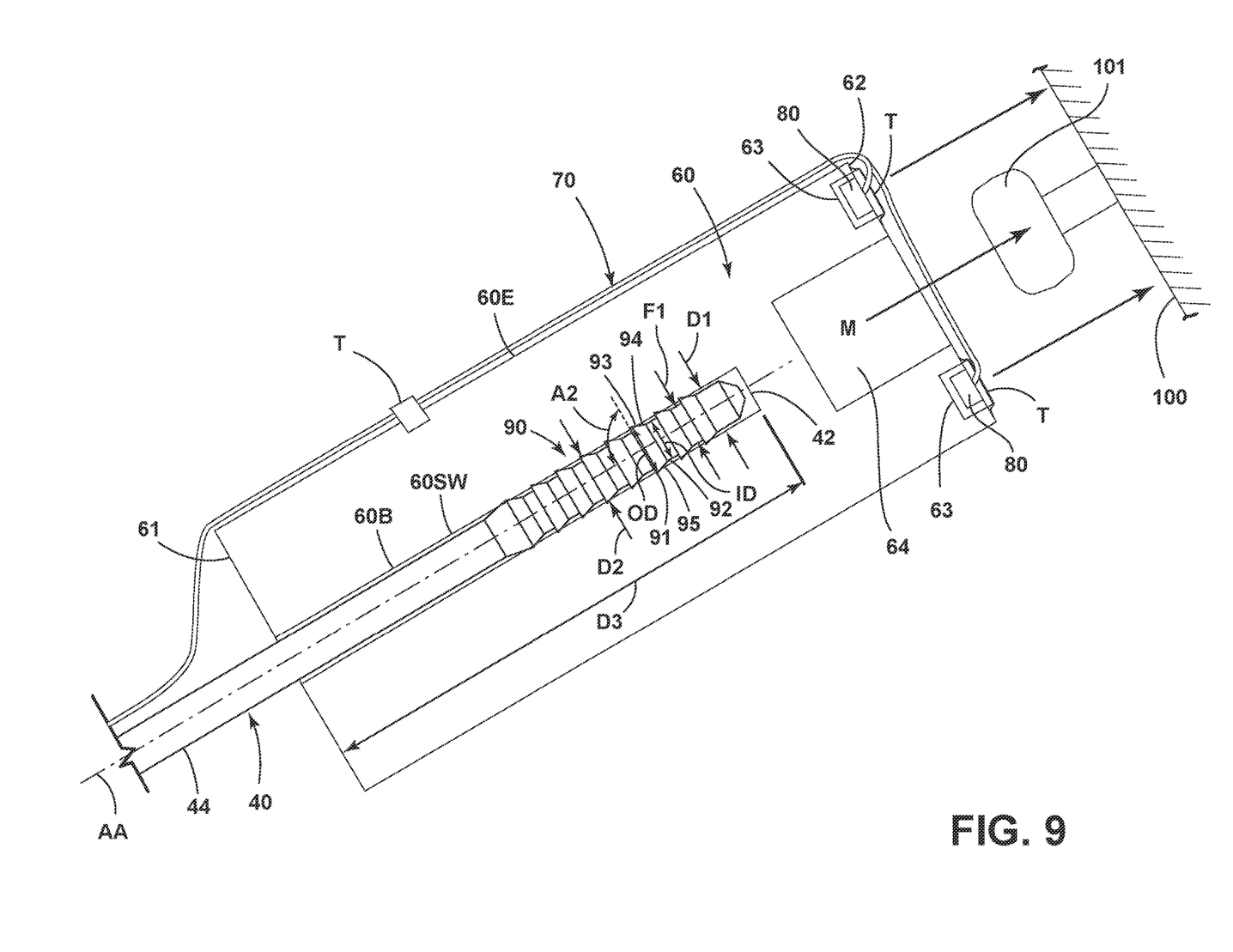
FIG. 9 is a view of the charge placement arm and barbs engaging an insert.

Optionally, each barb can include a frustoconical exterior surface 93 that forms the flared shape. Each of the barbs 90 can include a frustoconical ring shape generally circumferentiating the arm axis AA. In some alternative applications, the flare can be formed by angular ramps that generally flare or taper outward, away from the arm axis AA as they extend rearward, away from the distal tip 42. With reference to FIG. 9, the barbs 90 can flare outward extending from the distal end 22 toward the proximal end 91 and can transition to an optional shoulder 93. That shoulder can transition radially inward toward the shaft and the arm axis. Optionally, the shoulder can be disposed at an angle A2 relative to the arm axis AA. This angle A2 optionally can be between 45° and 120°, inclusive, between 45° and 90°, inclusive, between 45° and 60°, inclusive, or other angles depending on the application. Generally, the angle can be selected so that the proximal end 91 of the flare can bite into and frictionally engage a sidewall 60SW of the bore 60B that is defined in the insert 60, so that the insert 60 does not loosen from or become detached from the shaft 44 and/or the charge placement arm 40.

With further reference to FIGS. 8 and 9, the barbs 90 can be placed one adjacent the other so as to form a plurality of ridges and recesses that surround, circumferentiate or otherwise are disposed outwardly relative to the arm axis AA along the shaft 44. These barbs can be constructed so that each includes an inner diameter ID and an outer diameter OD. The inner diameter ID can be disposed at the distal end 92 of each the barbs. The outer diameter OD can be disposed at the proximal end 91 of each of the barbs. The inner diameter ID can be less than the outer diameter OD. Of course, where the barbs are not of a frustoconical or circular or rounded shape, these inner diameters and outer diameters can be simply dimensions rather than diameters. As used herein, diameter and dimension are interchangeable. Between the inner diameter ID and the outer diameter OD, each barb can include a ramped entry surface 95 that extends from the inner diameter to the outer diameter. This ramped entry surface optionally can be in the form of a frustoconical ring shape, one or more angular ramps, or some other rounded, concave or convex surface extending from the distal end 92 to the proximal end 91 of each respective barb.

Optionally, the inner diameter ID can be less than the outer diameter of each of the barbs, with the ramped entry surface disposed therebetween.

Each of the barbs 90 can be operable so as to slidingly engage the bore 60B so that the charge placement arm 40 can enter the bore 60B a predetermined depth D3 for adequate placement of the insert 60 on the arm 40. This predetermined depth D3 can vary depending on the insert and application. Where the barbs include the ramped entry surface 95, that surface can engage the sidewall 60SW of the bore 60B of the insert 60. Where the insert is constructed from a compliant material, such as a foam material or other soft, flexible or otherwise compliant or elastic material, those barbs can engage that sidewall 60SW as the charge placement arm 40 is slid into the bore 60B. As this occurs, the sidewall 60SW, which optionally can be in the form of a cylindrical configuration, can deform somewhat. For example, as the distal tip 42 of the charge placement arm 40 enters the bore 60B, eventually, the first, second, third, fourth etc. barbs can engage the sidewall 60SW of the bore 60B. As a result, the sidewall can be expanded. For example, the bore 60B can be of a cylindrical shape having a first diameter D1 before the insert is mounted to the arm 40. As a barb engages the sidewall 60SW, the sidewall and/or bore can be forcefully deformed and/or expanded such that the first diameter D1 expands to a second, greater diameter D2, in particular, where the sidewall engages an outer diameter OD of a respective barb, generally near the proximal end 91 of a barb.

Further optionally, as the shaft 44 is moved into the bore 60B, the sidewall 60SW can engage a distal end 92 of each barb. As the arm continues to enter the bore 60B, the sidewall can frictionally engage and ride along a ramped entry surface 95 of the barb. As it does so, that surface 95 can exert a force F1 on the sidewall so as to expand the dimension D1, which optionally can be a diameter of the bore 60B, to a second greater dimension or diameter D2. Where the sidewall engages the outer diameter OD of a barb at the shoulder, that second diameter D2 can be fully achieved. After the arm is advanced farther into the bore, the sidewall can pass a shoulder of one barb and subsequently engage another adjacent barb farther from the distal tip 42. When this occurs, the process repeats and the sidewall is expanded again to the second, greater diameter D2. This expansion and/or deformation can occur across all the barbs. Although not shown, the barbs can become progressively larger such that the other diameters of the barbs closer to the proximal end 41 of the arm become greater, farther from the distal tip 42. In other applications, the barbs themselves can be in the form of gentle waves or undulations along the exterior surface of the shaft 44. In yet other applications, the barbs can be of varying shapes, such as hemispherical projections, tetrahedral projections, rounded projections or other types of projections extending outward and away from the arm axis AA. Generally, the barbs can extend radially outward from the arm axis AA and can circumferentiate that axis and/or the shaft 44.

When the insert 60 is impaled by the charge placement arm 40 and the barbs 90 engage the bore 60B, in particular the sidewall 60SW of the insert 60, the insert can be secured to the charge placement arm 40. FIGS. 1 and 9 illustrate an optional configuration for the insert 60. There, the insert 60 as shown can define the bore 60B having the sidewall 60SW as described above. The insert 60 also can include an exterior surface 60E which can be in the form of a cylinder. Of course, other shapes, such as star shapes, triangular shapes, cone shapes, pyramidal shapes or other shapes can be selected for that exterior surface shape of the insert. The insert can include a proximal end 61 and a distal end 62. The distal end 62 can be constructed so that breaching devices 80 can be secured to that distal end 62. As shown, the insert 60 can be modified by a breacher or other user to include recesses 63. These recesses can be cut into the insert and sized to receive the breaching devices 80. The breaching devices 80 can be secured in those recesses 63 via one or more pieces of adhesive tape T. The tape T also can secure the shock tube 70 to the exterior surface of the insert or other components of the breaching pole 10 depending on the application and suitable securement of the shock tube 70 to the breaching pole. As further shown in FIG. 9, the insert 60 can be modified to define in another recess 64. This recess 64 can be sized to receive a door handle 101 of a door 100, or other structure within an entryway of a building. In this manner, the insert 60 can be moved in direction M toward the door handle 101 and the structure 100. In so doing, the door handle 101 can fit within the recess 64 and the breaching devices 80 can be disposed adjacent and/or around the door handle 101 and near the structure 100 of the door. Thus, when the energetic or explosive materials of the breaching devices 80 are detonated or initiated, they can damage, defeat or render inoperable a locking mechanism associated with the door handle 101, the door handle itself or defeat the glass of a window or the window sash. Accordingly, the door can be swung or can swing open, optionally via a focused shock wave generated by the breaching devices 80.

As mentioned above, the insert 60 can be constructed from a foam material, or any suitable material that provides a low to no fragmentation hazard. Foam can be provided in a cylindrical shape as shown or as a block or other shape, and then modified by a breacher or other user using a utility knife or other sharp tool. The user can cut the recesses 63 and 64 precisely in relevant surfaces of the insert 60, removing the foam to create those recesses. The foam can be a densely packed closed cell foam, or in some cases an open cell foam. A variety of different types of foams and compliant materials can be used to construct the insert 60.

The insert 60 also can be modified to include the bore 60B. This can be accomplished by using a drill bit on a drill or other tool to drill the bore 60B within the insert 60. Although the bore 60B is shown extending along a centerline of the insert, the bore can be drilled by user using a drill bit at any orientation through any portion of the insert 60, depending on the application. The drill bit used to drill the bore 60B can have a diameter that is less than the outer diameter OD of any of the barbs. Again this can produce a bore 60B that is small enough to allow the barbs to frictionally engage the sidewall 60SW of the bore 60B after it is drilled or otherwise formed so that the insert is held securely in place on the charge placement arm for placement against the door or other structure.

The breaching pole 10 of the current embodiments can be prepared and used in a variety of situations and manners to breach a structure, such as a door or entryway 100 to a building 102 or other structures as mentioned herein. In general, the method can include providing an elongated handle joined with an elongated arm joined with a charge placement arm, the charge placement arm including a proximal end and a distal tip, with a shaft having an arm axis and extending between the proximal end and the distal tip, the shaft defining a plurality of barbs; and placing an insert over the charge placement arm so that the barbs frictionally engage the insert to temporarily secure that insert to the charge placement arm.

Figure 10:
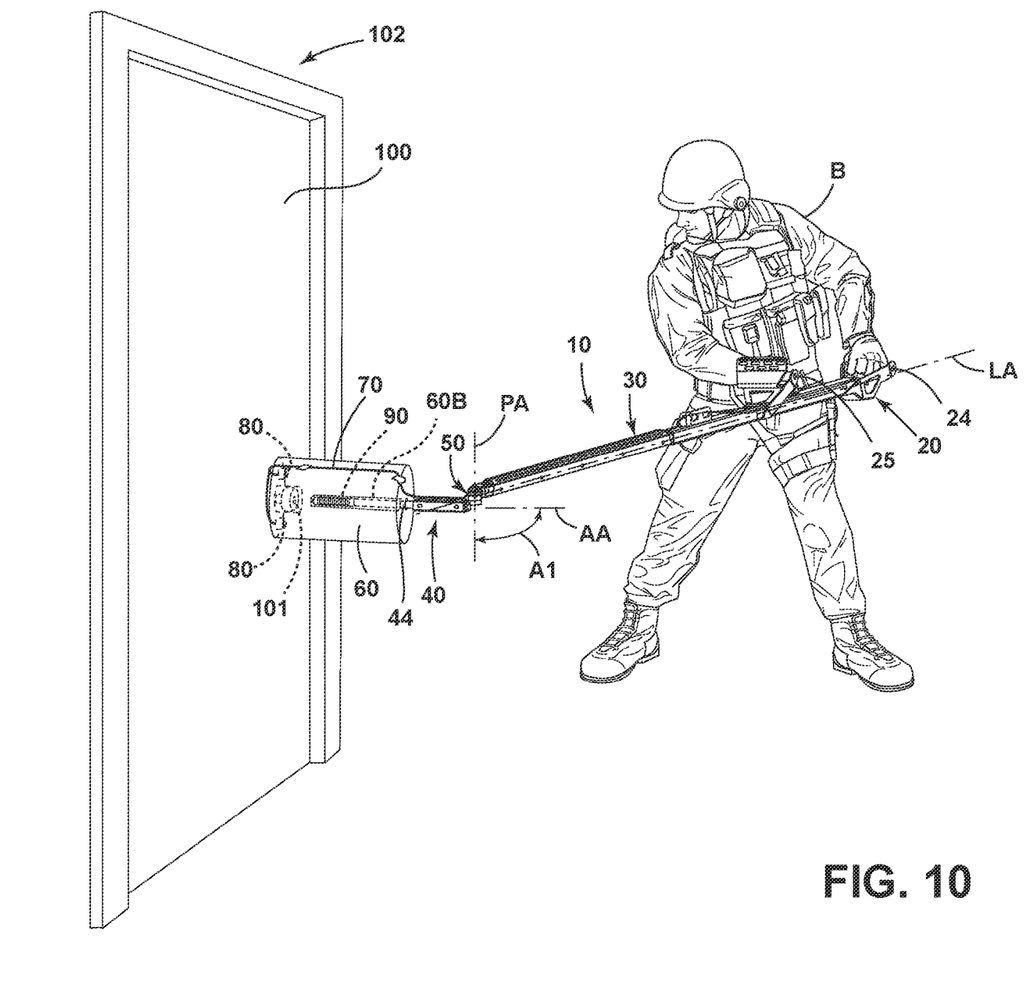
FIG. 10 is a perspective view of the breaching pole in use.

As mentioned above, before the breaching pole 10 is used to breach a structure 100 as shown in FIG. 10 by a breacher, the breacher can prepare the breaching pole and an insert with breaching devices. This can entail drilling the bore 60B in the insert 60 using an appropriately sized drill bit. The user also can use a utility knife or other cutting tool to form one or more recesses 63 and 64. The user can place the insert on the shaft 44 and in particular on the arm 40. As the user impales the insert 60 on the shaft, the barbs 90 can engage the sidewall of the bore 60B and frictionally engage and secure the insert to charge placement arm 40. Optionally, the insert can be pushed under the charge placement arm so that it engages a forward surface 43F of the arm 40. The user then can extend a shock tube from the actuator 75 through the guide tube and shroud 35, over the knuckle 50, along the insert 60 and to the breaching devices 80, which can be positioned at an end of the insert or some other location depending on the structure to be breached and desired direction of explosion. The user can use tape T or other fastening devices to further secure the shock tube 70 to the various components of the breaching pole and/or the insert.

The breacher B or user optionally can orient the arm axis AA relative to the longitudinal axis LA at some predetermined angle A1 that is sufficient for applying the insert in breaching devices 80 where they need to be relative to the door handle 101, lock, latches, or other structure of the door or entryway to satisfactorily open the structure to gain access to it. Again the angle A1 can be selected so that the breacher B can stand clear of the entryway of the building so that when the door is opened or blasted, the breacher is not in a line of fire of occupants in the building.

As shown in FIG. 10, the insert can be placed adjacent and/or over a portion of the handle 101 or other structure. The breaching devices 80 can be disposed adjacent that structure, held in place by the insert. Further, by optionally placing the recess of the insert including the breaching device with energetic material between the door handle and the door frame, the breacher can rest the insert on the door to provide additional support in holding the breaching pole in place. Pressure can be applied by the breacher against the door to ensure intimate contact between the charge and the door surface.

Once the insert is in place, the breacher B can initiate the actuator 75 to initiate the breaching materials 80, which subsequently modifies, damages, destroys or otherwise defeats the lock mechanism, the door handle, the door jamb, the door and/or another structure thereof, such as a window or light wall. The insert can direct the shockwave from the explosion toward the door and/or door handle thereby defeating it, and allowing it to be opened or to be forced open. With the charge placement arm 40 articulated using the articulating knuckle 50, the breacher also can be located out of and away from a shockwave generated from the explosion.

When the breaching device 80 is initiated, a shockwave from those devices can destroy or consume the insert, separating it from the charge plant arm into many fragments. The door, the handle, locking mechanism, latches, thresholds and the like also can be destroyed or defeated in a focused and controlled manner. Due to the construction of the barbs and the shaft, optionally as an integral single piece unit, all these components remain intact and produce no projectiles or shrapnel that could be dangerous to the breacher or other personnel.

During the explosion, the shockwave also can project outward, away from the door along the charge placement arm 40, over the shaft and barbs 90. Due to the optional flared shape of the barbs and the construction of the shaft and its relation to the barbs, the barbs and shaft maintain their integrity and again, do not create additional hazards for the breacher B. After the door is breached, the breacher and/or other personnel can enter the building and address the subject and/or any hostages appropriately.

Although the breaching pole 10 is described herein for use in connection with a breaching device, which optionally can be in the form of an explosive charge or other implement, other types of suitable attachments can be used with the breaching pole 10. For example, a camera having a video camera and associated lights may be attached to an appropriately configured breaching pole and insert. The camera and lights can be controlled by appropriate controls disposed somewhere along the elongated handle 20 and/or elongated arm. Another option can be a modification of the insert 60 to form a container to deliver items into the structure or building. Yet another option can be to modify the insert to accommodate a noise flash diversionary device and direct the sound, light and overpressure onto a targeted area to defeat a locking mechanism using the breathing pole. A variety of other attachments can be used with the breaching pole, optionally utilizing a specially configured insert joined the pole via the charge placement arm and its associated barbs.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered elements. The same is true for the naming of any other elements in the form of a first element, second element, third element, etc. as used herein.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A breaching pole comprising:
    an elongated tubular handle projecting from a proximal end to a distal end along a longitudinal axis;
    a grasping handle mounted in proximity to the tubular handle and transverse to the longitudinal axis such that a user can grasp both the tubular handle and grasping handle simultaneously;
    an elongated arm joined with and extending away from the distal end of the tubular handle, the elongated arm including a proximal end joined with the distal end of the tubular handle and a distal end;
    an articulating knuckle joined with the distal end of the elongated arm; and
    a charge placement arm joined with the articulating knuckle such that the charge placement arm can articulate through an angle of at least 45 degrees offset relative to the longitudinal axis, the charge placement arm including a proximal end joined with the articulating knuckle and a distal tip, with a shaft having an arm axis and extending between the proximal end and the distal tip, the shaft defining a plurality of barbs extending radially outward from the arm axis, the plurality of barbs sized and spaced relative to one another so as to frictionally engage an insert placed over the charge placement arm to secure that insert to the arm,
    whereby the breaching pole is operable to place the insert adjacent a structure using the charge placement arm and subsequently operate a breaching device associated with the insert in breaching the structure.

2. The breaching pole of claim 1,
wherein each of the plurality of barbs includes a flared shape including a proximal end and a distal end,
wherein each barb flares outward as the barb extends from the distal end toward the proximal end of the barb.

3. The breaching pole of claim 2,
wherein each barb includes a frustoconical exterior surface that forms the flared shape.

4. The breaching pole of claim 3,
wherein the proximal end of each barb includes a shoulder that transitions radially inward toward the shaft, such that the shoulder is disposed at an angle between 45 degrees and 90 degrees, inclusive, relative to the arm axis.

5. The breaching pole of claim 1,
wherein each of the plurality of barbs include a frustoconical ring shape that circumferentiates the arm axis.

6. The breaching pole of claim 5,
wherein the insert is constructed from a compliant material and includes a bore having a first diameter,
wherein each of the plurality of barbs includes an outer diameter and an inner diameter,
wherein the first diameter is less than the outer diameter and greater than the first diameter,
wherein each of the plurality of barbs includes a ramped entry surface that is operable so as to slidingly engage the bore with a ramped entry surface so that the charge placement arm can enter the bore a predetermined depth.

7. The breaching pole of claim 1, comprising:
an elongated shroud joined with and extending from the elongated arm,
a guide tube disposed within the elongated shroud,
wherein the guide tube and elongated shroud are configured to surround a shock tube extending within the guide tube from a position adjacent the grasping handle toward the articulating knuckle.

8. The breaching pole of claim 7,
wherein the breaching device includes an explosive charge,
wherein the breaching device is secured to the insert a distance from the shaft,
wherein the shock tube extends to the breaching device and is operably joined therewith.

9. The breaching pole of claim 1 comprising:
wherein the charge placement arm registers within a bore of the insert,
wherein the insert is constructed from compliant material such that the insert deformably engages the plurality of barbs as the shaft is inserted into the bore of the insert.

10. The breaching pole of claim 1,
wherein the plurality of barbs are covered by the insert when the shaft is disposed in a bore of the insert,
wherein the insert is constructed from a compliant material that conforms to the plurality of barbs.

11. A breaching pole comprising:
an elongated arm; and
a charge placement arm joined with the elongated arm, the charge placement arm including a proximal end and a distal tip, with a shaft having an arm axis and extending between the proximal end and the distal tip, the shaft having a plurality of barbs sized and spaced relative to one another so as to frictionally engage an insert placed over the charge placement arm to secure the insert to the charge placement arm,
whereby the breaching pole is operable to place the insert adjacent a structure using the charge placement arm and subsequently operate a breaching device associated with the insert in breaching the structure.

12. The breaching pole of claim 11,
wherein each of the plurality of barbs includes a flared shape including a proximal end and a distal end,
wherein each barb flares outward as the barb extends from the distal end toward the proximal end of the barb,
wherein each barb is of a ring shape that circumferentiates the arm axis.

13. The breaching pole of claim 12,
wherein the charge placement arm registers within a bore of the insert,
wherein the insert is constructed from compliant material such that the insert deformably engages the plurality of barbs as the shaft is inserted into the bore of the insert, the insert covering the plurality of barbs.

14. The breaching pole of claim 11,
wherein the proximal end of each barb includes a shoulder that transitions inward toward the shaft,
wherein the shoulder is disposed between an angle of 45 degrees and 90 degrees, inclusive, relative to the arm axis.

15. The breaching pole of claim 11,
wherein the insert is constructed from a compliant material and includes a bore having a first diameter and a sidewall,
wherein each of the plurality of barbs includes an outer diameter and an inner diameter,
wherein the first diameter is less than the outer diameter such that each of the barbs frictionally engages the sidewall to secure the insert to the shaft.

16. The breaching pole of claim 15,
wherein each of the plurality of barbs includes a ramped entry surface that is operable so as to slidingly engage the bore with the ramped entry surface to increase the first diameter to a second diameter, greater than the first diameter, adjacent each barb.

17. A breaching pole comprising:
an elongated tubular handle projecting from a proximal end to a distal end along a longitudinal axis;
a grasping handle mounted in proximity to the tubular handle and transverse to the longitudinal axis such that a user can grasp both the tubular handle and grasping handle simultaneously;
an elongated arm joined with and extending away from the distal end of the tubular handle, the elongated arm including a proximal end joined with the distal end of the tubular handle and a distal end;
an articulating knuckle joined with the distal end of the elongated arm;
a charge placement arm joined with the articulating knuckle such that the charge placement arm can articulate through an angle of at least 45 degrees offset relative to the longitudinal axis, the charge placement arm including a proximal end joined with the articulating knuckle and a distal tip, with a shaft having an arm axis and extending between the proximal end and the distal tip, the shaft defining a plurality of barbs extending radially outward from the arm axis, the plurality of barbs sized and spaced relative to one another so as to frictionally engage an insert placed over the charge placement arm to secure that insert to the arm;
an elongated shroud joined with and extending from the elongated arm; and a guide tube disposed within the elongated shroud, wherein the guide tube and elongated shroud are configured to surround a shock tube extending within the guide tube from a position adjacent the grasping handle toward the articulating knuckle, wherein the insert is constructed from a compliant material and includes a bore having a first diameter, wherein each of the plurality of barbs includes an outer diameter and an inner diameter, wherein the first diameter is less than the outer diameter, wherein each of the plurality of barbs are operable to slidingly engage the bore with a ramped entry surface so that the shaft can enter the bore a predetermined depth.

* * * * *